(12) United States Patent
Goering et al.

(10) Patent No.: US 8,087,222 B2
(45) Date of Patent: Jan. 3, 2012

(54) COTTON PICKER SPINDLE WITH GREASE RESERVOIR AND A GREASE AND DIRT SEAL

(75) Inventors: Kevin Jacob Goering, Cambridge, IA (US); Scott F. Stueck, Elkhart, IA (US)

(73) Assignee: Deere & Company, Moline, IL (US)

( * ) Notice: Subject to any disclaimer, the term of this patent is extended or adjusted under 35 U.S.C. 154(b) by 382 days.

(21) Appl. No.: 12/190,047

(22) Filed: Aug. 12, 2008

(65) Prior Publication Data

US 2010/0037579 A1 Feb. 18, 2010

(51) Int. Cl.
*A01D 45/02* (2006.01)
(52) U.S. Cl. .............................. 56/50; 56/36
(58) Field of Classification Search .................. 56/12.3, 56/16.8, 28, 36, 40, 41, 44, 45, 50, 327.1–340; 277/567

See application file for complete search history.

(56) References Cited

U.S. PATENT DOCUMENTS

| | | | | |
|---|---|---|---|---|
| 2,497,777 A | * | 2/1950 | Baker et al. | 56/50 |
| 2,713,239 A | * | 7/1955 | Dermid | 56/50 |
| 3,387,439 A | * | 6/1968 | Tracy | 56/50 |
| 4,757,671 A | | 7/1988 | McConnell | |
| 4,840,018 A | * | 6/1989 | Deutsch | 56/12.3 |
| 5,394,680 A | | 3/1995 | Sheldon, Jr. et al. | |
| 7,021,633 B2 | * | 4/2006 | Gorman | 277/549 |

* cited by examiner

*Primary Examiner* — Thomas Will
*Assistant Examiner* — Mai Nguyen

(57) ABSTRACT

A spindle assembly includes a spindle with a blind bore extending along the spindle axis from the drive gear towards the outer end to reduce spindle weight and provide a lubrication reservoir in the spindle. Cross-formed holes extend from the blind bore through to the bearing surface of the spindle. Lubricant from the spindle bars passes into the bore where it is stored and distributed to the journal areas through the small metering apertures. A very low friction seal between the outer bushing and dust collar is pressed into the spindle nut and seals against the polished chrome spindle surface. The seal allows a slight amount of lubricant passage outwardly from the bushings while limiting inward movement of dust towards the bushings.

20 Claims, 1 Drawing Sheet

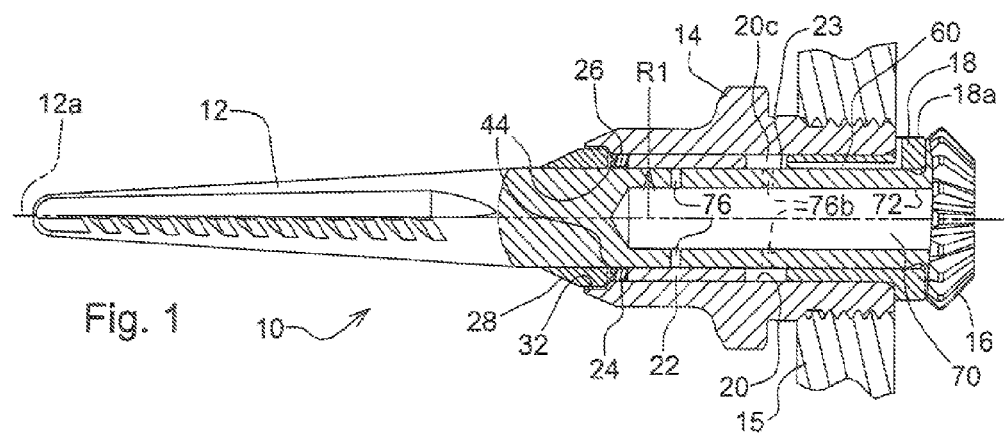
Fig. 1
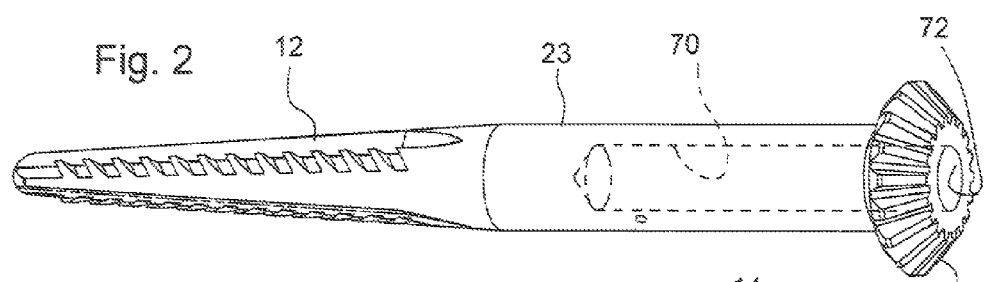
Fig. 2
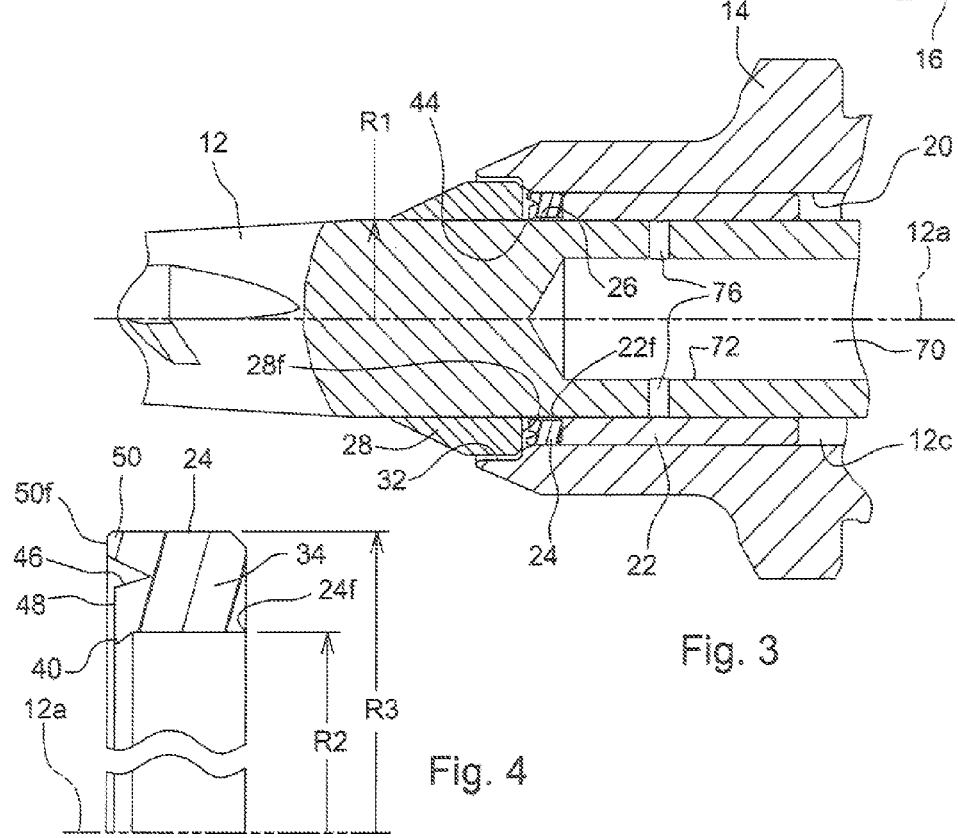
Fig. 3
Fig. 4

COTTON PICKER SPINDLE WITH GREASE RESERVOIR AND A GREASE AND DIRT SEAL

FIELD OF THE INVENTION

The present invention relates generally to cotton harvesters and, more specifically, to spindles for such cotton harvesters.

BACKGROUND OF THE INVENTION

A typical cotton picker includes a plurality of rotating barbed spindles which project into the plants. A picker drum assembly includes a plurality of vertical picker bars which each support a column of rotatable picker spindles. Each spindle is elongated and includes a drive gear which is driven to rotate the spindle about its principle axis as the barbs engage the cotton. The cotton wraps around the spindles and is doffed therefrom by a doffing mechanism which includes a plurality of flexible doffers, one for each row of picking spindles. Cotton pickers typically include from two to six forwardly located row units, each unit supporting a pair of upright picker drums having from twelve to sixteen picker bars. Each picker bar, in turn, rotatably supports up to twenty picker spindles. Several hundred spindles are therefore supported from each drum, and a large amount of mass is put in motion when the picker drums are rotated. The rotational speed of the spindles is on the order of 4000 rpm, and therefore the gyroscopic effect is substantial and adds to the forces generated by the system. The row units are relatively heavy and their weight shifts the center of gravity of the harvester forwardly. The weight of the spindles increases forces on drives and cam tracks.

A typical cotton picker spindle has a generally solid body fabricated from special heat-treated steel which is chrome plated to provide a hard, smooth surface. Such spindles have a high density and add a substantial amount of weight to the driven portion of the row unit. The drive speed of the picker drum assembly and thus machine productivity is limited by the amount of mass in motion.

A lubrication path directs grease through the picker bar to lubricate the bevel drive gears and the journal areas of the spindles. The picker bars must be greased at regular intervals to maintain adequate lubrication at the spindle journals. If the lubrication interval is too long, the spindle bearings do not receive adequate grease and will suffer premature wear and failure. Most spindle mounting nut assemblies are unsealed, so grease tends to leak out from the spindles, especially when the picker bars are over-greased to assure adequate spindle lubrication. The outward movement of grease flushes dust from the assembly to reduce contaminants in the picker bar. If the intervals between greasing are too long, dirt is inadequately flushed and wear is increased.

U.S. Pat. No. 4,757,671 discloses a seal assembly for reducing the amount of grease lost by the spindle assembly area and reducing the amount of contaminants entering the drive and journal areas. A first sealing ring contacts and seals the outer surface of the spindle. A second sealing ring, mounted over the first ring, seals non-moving components. Although the seal assembly reduces contaminants and the amount of lost lubricant, the seals tend to add substantial drag and significantly increase the power required to drive the large number of spindles on each drum. Previously, the amount of added power required by the seal assembly was high enough to make the seal assembly impractical.

SUMMARY OF THE INVENTION

It is therefore an object of the present invention to provide an improved spindle assembly for a cotton harvester and spindle therefore. It is a further object to provide such an assembly and spindle which decrease weight and mass in motion and increase service interval, part life, and lubrication retention within the spindle assembly without adding substantial spindle drag.

It is a further object of the present invention to provide an improved spindle assembly which increases lubrication capacity and reduces the frequency of spindle bar lubrication without compromising spindle journal lubrication. It is a further object to provide such an assembly having a dirt and lubricant seal with relatively little drag.

A spindle assembly includes a spindle with a blind bore extending along the spindle axis from the drive gear towards the outer end. Cross-formed holes extend from the blind bore through to the bearing surface of the spindle. Lubricant from the spindle bars passes into the bore where it is stored and distributed to the journal areas through the holes.

The spindle bores reduce the mass of the spindles to allow higher picking speeds. The lower spindle mass decreases gyroscopic effects, geartrain and cam track forces, and power requirements. The center bore defines a cavity or reservoir for accumulating spindle grease for wear-reducing, continuous picker bar component lubrication. The reservoir allows longer picker bar lubrication intervals. The holes are designed to deliver a steady and predictable amount of grease to the bushings between lubrication intervals to extend bushing life. Drum rotation acts to direct lubricant into the cavity, and spindle rotation directs lubricant from the cavity towards the bearing surfaces.

A very low friction seal between the outer bushing and dust collar is pressed into the spindle nut and seals against the polished chrome spindle surface. The contact area between the seal and the spindle is very narrow and seal contact force is small to reduce drag. The seal is designed to allow a slight amount of lubricant passage outwardly from the bushings while limiting inward movement of dust towards the bushings. The seal substantially reduces lubricant usage without significantly increasing drag.

These and other object, features and advantages of the present invention will become apparent from the description below in view of the drawings.

BRIEF DESCRIPTION OF THE DRAWINGS

FIG. 1 is a side view, partially in section, of a cotton picker spindle assembly.

FIG. 2 is a side perspective of the cotton picker spindle for the assembly of FIG. 1.

FIG. 3 is an enlarged cross-sectional view of the seal portion of the spindle assembly of FIG. 1.

FIG. 4 is an enlarged view, partially in section, of the dirt and lubricant seal for the assembly of FIG. 1

DESCRIPTION OF THE PREFERRED EMBODIMENT

Referring to FIG. 1, there is shown a spindle assembly 10 including a barbed cotton picker spindle 12 journalled for rotation about a spindle axis 12a within a conventional spindle nut 14. The spindle nut 14 is threaded and adapted to be mounted in an upright cotton picker bar, a portion of which is shown at 15 The spindle 12 includes a bevel gear 16 adapted for mating with a similar bevel gear (not shown) supported for rotation within the picker bar 15. For further details of the picker bar assembly and drive arrangement, reference may be had to U.S. Pat. No. 4,463,543 issued to Hubbard et al and incorporated herein by reference.

The assembly 10 includes a first or inner bushing 18 press-fitted into a cylindrical bore 20 within the spindle nut 14. A second or outer bushing 22 is press-fitted into the bore 20 at the opposite end of the nut 14 and is offset axially outwardly from the outer end of the bushing 18 to define an annular cavity 20c encircling a cylindrical journal area or shank 23 of the spindle 12. A lubricant and dirt seal 24 is located axially outwardly of the second bushing 22 in an annular cavity 26. A dust collar 28 is located on the shank 23 of the spindle 12 outwardly adjacent the seal 24 and projects into an annular recess 32 at the outer end of the spindle nut 14. The collar 28 has an inner face 28f offset outwardly from an outer face 22f of the outer bushing 22 to define the seal-receiving cavity 26. The seal 24 is designed to minimize drag on the spindle and dust collar and to allow movement of only a small portion of lubricant outwardly from the outer bushing 22 past the dust collar 28 at the annular recess 32 while reducing or eliminating axially inward migration of dirt and other contaminants that get past the dust collar 28.

As shown in the figures, the seal 24 includes a ring-shaped main body 34, preferably fabricated from a material such as nitrile. The seal body 34 has an inner radius R2 slightly larger than the outer radius R1 of the spindle shank 23 and an outer radius R3 approximately equal to the radius of the bore 20 to provide a firm interference fit against the spindle nut 14 when the seal 24 is pressed into the cavity 26. Since the inner radius R2 is larger than the shank radius, the seal main body 34 does not frictionally engage the spindle 12. As can be appreciated from the drawings which are generally to scale, the area of seal to spindle contact is minimal.

An angled lip or seal portion 40 extends axially outwardly and radially inwardly from the main body 34 to a very narrow edge contact area 44 on the surface of the shank 23. The seal 24 is designed so the lip provides minimal force or interference against the rotating spindle. Various means can be provided to minimize the drag on the spindle and limit outward movement of lubricant. As shown, a V-shaped groove 46 in outwardly facing wall portion 48 of the seal 24 provides flexibility for the seal portion 40 and helps to maintain a light bias of the portion 40 towards the contact area 44 on the shank surface. Other seal configurations may be used to minimize contact area on the shank surface and limit seal to spindle contact force for minimal drag.

An upper portion 50 above the groove 46 extends axially outwardly a short distance beyond the axially outwardly projection of the seal portion 40. Outward face 50f of the upper portion 50 is in non-contacting relationship with the dust collar 28 to help reduce drag between the non-rotating seal 24 and the dust collar 28 which rotates with the spindle 12. The dust collar 28 protects the seal 24 from being damaged by crop material. The seal 24 includes an inward face 24f which abuts the outer axial face of the bushing 22. The seal portion 40 is ramped radially inwardly and axially outwardly so that a limited amount lubricant can work its way outwardly between the dust collar 28 and the spindle nut 14. However, the ramped seal portion 40 angling radially inwardly and axially outwardly effectively prevents most contaminants from working inwardly towards the bushings 22 and 18.

As best seen in FIG. 1, the inner bushing 18 includes a groove 60 which extends from an enlarged innermost end 18a of the bushing 18 through to the cavity 20c defined between the bushings 18 and 22. Lubricant from the interior of the spindle bar 15 is directed through the channel 18 to the cavity 20c to lubricate the bushings 18 and 22.

To reduce the weight of the spindle 12 and provide a lubrication reservoir or cavity 70, the inner end of the spindle 12 is formed hollow. A blind bore 72 centered on the spindle axis 12a extends through the bevel gear 16 to a location generally aligned with the outer end of the outer bushing 22. The diameter of the bore 72 is slightly greater than one-half the diameter of the spindle shank 23 to significantly reduce the weight of the spindle 12 compared to a conventional solid spindle. Lubricant from the interior of the spindle bar 15 is forced into the cavity by the centrifugal force generated by the rotating picker drum, and sized metering cross holes 76 extend radially from the cavity to the central portion of the outer bushing 22 to channel lubricant to the bushing 22 by the centrifugal force of the spindle rotating about the axis 12a. Additional cross holes 76b intersecting the bore 72 may be provided to channel lubricant to other areas of the bushings and/or to the cavity 20c.

In operation, grease initially flows into the spindle bar and spindles by pressure from the lubrication system. Once the row unit starts operating, the grease flows vertically by gravity through the picker bar 15. Grease flows laterally and into the spindle cavity 70 by centrifugal force as the picker bar rotates around the row unit picker bar drum. As the spindle 12 rotates about the spindle axis 12a, grease flows through the metering cross holes 76, also by centrifugal force. The holes 76 are sized to provide the right amount of lubricant to the wear surfaces.

Having described the preferred embodiment, it will be apparent that modifications can be made without departing from the scope of the invention as defined in the accompanying claims.

The invention claimed is:

1. A cotton picker spindle assembly comprising:
    a cotton picker spindle support having a generally cylindrically shaped bore;
    a bushing adapted for receipt within the bore;
    a spindle having a cylindrically shaped shaft with a shaft surface rotatably supported within the bushing for rotation about a spindle axis and having a driven end and a picking end integral with the driven end;
    the spindle including a lubrication cavity extending axially from the driven end towards the picking end; and
    lubrication apertures extending radially from the cavity to the shaft surface.

2. The spindle assembly as set forth in claim 1 further comprising a lubrication and dirt seal supported in one end of the bushing, the seal limiting lubricant flow from outwardly from the spindle and preventing dirt from entering the bushing.

3. The spindle assembly as set forth in claim 2 wherein the seal includes a seal main body generally non-contacting relative to the spindle with lip structure angled with respect to the spindle axis, the lip structure extending axially outwardly and radially inwardly from the main body and terminating in a narrow edge contacting the spindle and for minimizing seal contact force of the lip structure against the spindle to limit drag on the spindle.

4. The spindle assembly as set forth in claim 1 wherein the shaft has a radius R1 and the lubrication cavity is centered on the spindle axis and has a radius at least half the radius R1 to minimize spindle weight.

5. The spindle assembly as set forth in claim 4 wherein the lubrication cavity is generally coextensive with the bushing.

6. The spindle assembly as set forth in claim 1 wherein the bushing comprises an inner bushing and an outer bushing offset axially outwardly from the inner bushing and defining a lubrication storage area therebetween.

7. The spindle assembly as set forth in claim 6 wherein at least one of the apertures opens to the lubrication storage area and lubricant is directed outwardly from the cavity to the storage area by centrifugal force as the spindle rotates about the spindle axis.

8. A cotton picker spindle assembly comprising a spindle nut with a cylindrical bore, an inner bushing press-fit into the cylindrical bore at one end of the nut, an outer bushing press-fitted into the bore at an opposite end of the nut, an annular cavity located axially outwardly of the outer bushing, a lubricant and dirt seal located in the annular cavity, a spindle with a cylindrical shank having a radius R1, a dust collar located on the cylindrical shank outwardly adjacent the dirt and lubricant seal, the dust collar projecting into the annular cavity, the dust collar having an inner face offset outwardly from an outer face of the outer bushing to define the annular cavity, wherein the seal includes means for minimizing drag on the spindle and limiting outward movement of lubricant from the outer bushing past the dust collar while reducing or eliminating axially inward migration of dirt and other contaminants that get past the dust collar, the seal being in non-contacting relationship with the dust collar and including a radially inwardly biased narrow lip contacting a narrow area of the cylindrical shank.

9. The cotton picker spindle assembly as set forth in claim 8 wherein the seal includes a ring-shaped main body having an inner radius R2 slightly larger than the outer radius R1 of the spindle shank and an outer radius R3 approximately equal to the diameter of the bore to provide a firm interference fit against the spindle nut when the seal is pressed into the cavity.

10. The cotton picker spindle assembly as set forth in claim 9 wherein the seal includes a seal main body is offset radially outwardly of the spindle, the narrow lip biased radially inwardly from the main body into generally an edge contact with the shank.

11. The cotton picker spindle assembly as set forth in claim 10 wherein the narrow lip ramps axially outwardly away from the outer bushing.

12. The cotton picker spindle assembly as set forth in claim 8 wherein the spindle includes an driven end having a bevel gear and an opposite outer end, and a blind bore extending axially through the bevel gear end towards the outer end to reduce weight of the spindle and provide a lubrication cavity opening through the bevel gear.

13. The cotton picker spindle assembly as set forth in claim 12 including a sized aperture extending radially from the blind bore through the shank, wherein lubrication is metered outwardly from the lubrication cavity to the shank by centrifugal force as the spindle rotates about the spindle axis.

14. The cotton picker spindle assembly as set forth in claim 13 wherein the aperture opens adjacent the outer bushing.

15. The cotton picker spindle assembly as set forth in claim 12 wherein the blind bore has a radius at least half the radius R1.

16. A cotton picker spindle for a spindle assembly, the spindle including a rotational axis, a driven end having a bevel gear centered on the rotational axis, an outer end opposite the driven end, the spindle including a cylindrical portion having an outer bearing surface adapted for rotation within bushing structure, and a bore extending axially from the driven end and through the cylindrical portion towards the outer end to reduce weight of the spindle and define a lubrication cavity, and a lubrication aperture extending from the bore to the outer bearing surface.

17. The cotton picker spindle for a spindle assembly as set forth in claim 16 wherein the cylindrical portion has a radius R1 and wherein the bore has a radius at least half the radius R1.

18. The cotton picker spindle for a spindle assembly as set forth in claim 16 wherein the bore is generally coextensive with outer bearing surface.

19. The cotton picker spindle for a spindle assembly as set forth in claim 16 wherein the aperture comprises a sized cross hole extending radially through the cylindrical portion for metering lubricant from the bore by centrifugal force as the spindle rotates.

20. The cotton picker spindle as set forth in claim 16 wherein the bore comprises a blind bore extending through the bevel gear.

\* \* \* \* \*